Jan. 8, 1935.  P. H. SHUSTER  1,987,520
METHOD OF FORMING IMPLEMENT SHANKS
Filed Feb. 16, 1933
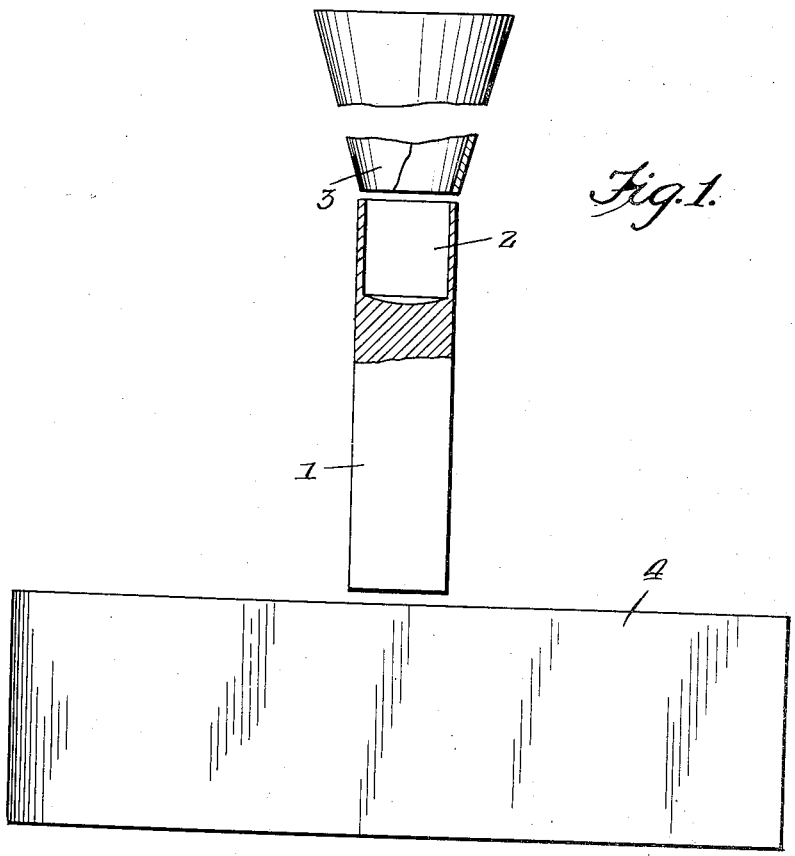
Fig. 1.
Fig. 2.
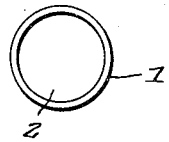
Inventor
Paul H. Shuster,
By Clarence A. O'Brien
Attorney Patented Jan. 8, 1935

1,987,520

UNITED STATES PATENT OFFICE 1,987,520

METHOD OF FORMING IMPLEMENT SHANKS

Paul H. Shuster, Leechburg, Pa.

Application February 16, 1933, Serial No. 657,087

1 Claim. (Cl. 76—113)

This invention relates to a method of forming implement shanks.

One of the objects of the invention is to provide a method wherein agricultural implements of the character of hand tools such as rakes, hoes, spades and shovels may be made with solid steel shanks without cumbersome and expensive equipment and thereby promote uniformity in the finished product which latter feature is difficult to control in the conventional manufacturing practice.

The method in its essential parts comprehends the construction of a solid steel shank with a cavity or recess on one end to which is electrically butt welded the handle receiving ferrule and then butt welding the implement head blank to the other solid end of the shank.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is an elevation, partly in section, of the bar forming the subject matter of the invention, this view also showing the tubular part and the block, which are to be connected together by the bar.

Figure 2 is an end view looking into the recess of the bar.

As shown in these views, I provide a cylindrical piece of steel 1 which has a recess 2 at one end, with the rest of the piece solid. A tube 3 has one end placed against the recessed end of the bar 1 and the two parts electrically butt welded and the other or solid end of the bar or piece 1 being electrically butt welded to the edge of a solid bar or block of steel as shown at 4.

The thickness of the wall formed by the recess 2 should be the same as that of the tube to be welded on the bar.

As before stated, the invention may be used in the manufacture of shovels of all kinds and rakes, forks and hoes and can also be used for other purposes. For instance, when the invention is used in the manufacture of shovels, the solid end of the bar 1 is welded to an edge of the block from which the shovel body is to be formed and the recessed end of the bar 1 is welded to the ferrule forming part which is to receive an end of the handle of the shovel.

It is thought from the foregoing description that the advantages and novel features of my invention will be readily apparent.

It is to be understood that changes may be made in the construction and in the combination and arrangement of the several parts, provided that such changes fall within the scope of the appended claim.

What I claim is:—

The herein described process of connecting a metal tubular member forming a ferrule of a tool with a solid metal member from which the head of the tool is to be formed, consisting in forming a recess in one end of a bar of metal, then electrically butt welding the recessed end of the bar to an end of the tubular member and welding the solid end of the bar to an edge of the solid member.

PAUL H. SHUSTER.